United States Patent [19]
Collier

[11] 4,142,617
[45] Mar. 6, 1979

[54] HYDROSTATIC COUPLING

[76] Inventor: Samuel A. Collier, 1714 S. Olive, Pittsburg, Kans. 66762

[21] Appl. No.: 861,704

[22] Filed: Dec. 19, 1977

[51] Int. Cl.² .............................................. F16D 31/02
[52] U.S. Cl. ........................................ 192/60; 60/325; 60/494
[58] Field of Search ................. 192/60; 60/325, 327, 60/494

[56] References Cited

U.S. PATENT DOCUMENTS

| | | | |
|---|---|---|---|
| 1,173,622 | 2/1916 | Tompkins | 192/60 |
| 1,869,449 | 8/1932 | Worden | 192/60 |
| 1,907,278 | 5/1933 | Blecha | 192/60 |
| 2,018,743 | 10/1935 | Rodeghier | 192/60 |
| 2,539,872 | 1/1951 | Sprague | 192/60 |
| 2,735,530 | 2/1956 | Kostenko | 192/60 |

*Primary Examiner*—Edgar W. Geoghegan

[57] ABSTRACT

A rotary hydraulic coupling of the type wherein the powered movement of a plurality of reciprocable pistons, which are carried and driven by a drive shaft, work in cylinders which are carried by a driven shaft, and wherein the varying backup pressure of incompressible fluid within the cylinders is relied upon to apply torque to and thus rotate the driven shaft. A sealed casing rotates in unison with the driven shaft and establishes an internal fluid reservoir, while the drive shaft projects into the casing and, by means of a crank arm, reciprocates the pistons. Inflow check valves leading from the reservoir allow fluid to be drawn into the cylinders while outflow check valves leading from the cylinders allow fluid to be forced directly into a manifold which is separated from the reservoir. The pressure attained in the manifold is reflected as backup pressure in the cylinders, such pressure varying the torque which is applied to the casing and driven shaft. A plurality of passages establish communication between the manifold and reservoir, while a novel valving arrangement variously controls the flow of fluid through such passages from the manifold to the reservoir in such a manner that a time delay is effected before full torque is applied to the output shaft. Means are provided whereby the extent of the time delay period may be varied.

16 Claims, 6 Drawing Figures

HYDROSTATIC COUPLING

The present invention relates generally to transmission mechanism and has particular reference to an improved rotary hydrostatic coupling by means of which the rotary motion of a drive shaft may be transmitted to a driven shaft. Still more specifically, the invention is concerned with that class of rotary hydrostatic coupling wherein the powered movement of a plurality of radially reciprocable pistons which are carried and driven by the drive shaft work in cylinders which are carried by the driven shaft and whereby the varying backup pressure of an incompressible fluid within the cylinders is relied upon to rotate the driven shaft.

Exemplary of such a hydrostatic coupling is U.S. Pat. No. 2,018,743, granted on Oct. 29, 1935 and entitled "Hydraulic Device," wherein there is disclosed a sealed rotatable casing establishing a fluid filled chamber or reservoir and carrying radially disposed cylinders which rotate in unison with the casing. The casing also carries an axially extending output or driven shaft. An input or drive shaft projects into the casing and, by means of eccentrically disposed crank arms, serves to reciprocate respective pistons within the cylinders. Unidirectional inflow check valves afford inlet ports which allow fluid to be drawn from the reservoir into the cylinders during the inward radial strokes of the pistons and similar outflow check valves afford outlet ports which allow such fluid to be forced from the cylinders back to the reservoir during the outward radial strokes of the pistons. External means is provided for varying the effective size of the outlet ports, to the end that when such ports are fully open there will be little or no backup pressure in the cylinders and no appreciable torque will be applied to the casing by the drive shaft. When the ports are partially closed, a commensurate amount of backup pressure will be induced in the cylinders and the driven shaft will be required to make several revolutions to attain a single revolution of the driven shaft. When the posts are fully closed, the backup pressure which is induced in the cylinders will be at a maximum and the casing will rotate in unison with the drive shaft due to the incompressibility of the fluid in the reservoir and cylinders.

There are in existence other patents showing similar structures and, insofar as I am aware, all of them depend for their operation upon external control means for varying the size of the outlet ports to relieve the backup fluid pressure developed within the cylinders in varying degrees, the transmission of torque to the casing and output shaft being a substantially direct function of the pressure developed in the cylinders during the outward stroke of the pistons. Thus all such patents are designed basically to vary the speed of the output shaft relative to the speed of the input shaft over a range of speed variance extending from no output shaft motion to motion of the output shaft in unison with the input shaft. Such speed ratio changes are invariably either manually effected or they are controlled by movement of an external lever or other movable member, the movement of which may be automatically programmed under the influence of some external machine function.

The hydrostatic coupling of the present invention, although it adopts the same basic principle of regulating the outflow of an incompressible fluidfrom a radially disposed cylinder, is entirely automatic in its operation and it embodies wholly contained or internal fluid passage and valving arrangements which are effective automatically without any attention on the part of an operator to permit the drive shaft to attain its normal or rated speed rapidly while bringing the driven shaft and its load up to the same speed at a considerably reduced rate of acceleration. One of the principal features of novelty associated with the present coupling resides in the provision of a novel means for effecting a time delay before full input torque is applied to the driven shaft. This time delay is effected by the use of novel control valving arrangements which gradually and in a uniform manner increase the torque which is applied to the driven shaft until maximum or full torque prevails upon such shaft. The time delay period is adjustable from a few seconds to several minutes, the gradual torque increase which is applied to the driven shaft covering the entire time span which is preset into the control valve arrangement. Varying of such time delay period may be accomplished by effecting relatively simple presetting operations upon the control valve arrangement from the exterior of the casing without necessitating dismantling of the coupling. A typical example of the use of such a time delay is in the use of the coupling for driving a long heavily loaded conveyor belt when it is desired to take up all of the slack in the belt before applying full driving force thereto.

Briefly, in carrying out the invention, the use of a rotatable sealed fluid-filled casing embodying internal radially disposed piston and cylinder arrangements with inflow and outflow check valves which communicate with an internal reservoir is preferred. However, instead of causing the outflow check valves to communicate directly with the reservoir through respective single variable size ports, as in the prior patents, a manifold is interposed between the outflow check valves and the reservoir and receives fluid directly from such valves, while a plurality of fluid passages extend variously between the manifold and reservoir. Since the manifold communicates directly with the outflow check valves, the backup pressure which is developed in the cylinders is a direct function of fluid pressure which is maintained in the reservoir. Associated with such fluid passages are a plurality of valve devices which cooperate with one another in an entirely automatic fashion after starting operations are commenced, the net effect of such cooperation being to spread the torque increase which is applied to the output shaft gradually and evenly over the full period for which the time delay is adjusted. Among the valve devices associated with the passages that extend from the manifold to the reservoir, are a centrifugal valve the function of which is to block the flow of fluid through its respective passage at such time as the driven shaft attains a predetermined speed, and a normally closed bypass valve the function of which is to become open and admit fluid through its respective passage from the manifold to the reservoir when an overload is encountered by the driven shaft, thus protecting the drive motor. Other valve devices including a main control valve, a volume valve, a metering valve, relief valve and a drain valve cooperate with one another in a particular manner, which will become readily apparent as the nature of the invention is better understood, to establish the aforementioned time delay and regulate the time which is allotted to the driven shaft in catching up with the rapidly attained speed of rotation of the drive shaft.

The adjustments which are available for the valving which is associated with the fluid passages that extend between the manifold and reservoir are capable of not only varying the extent of the time delay period, but, if desired, an adjustment may be made which will completely disable the time delay control valve mechanism and allow the centrifugal valve and the bypass valve to function in combination with each other to permit the drive shaft and its load to accelerate at the maximum rate of acceleration of the input shaft, i.e., to attain an almost immediate lockup drive of the driven shaft by the drive shaft.

The provision of a hydrostatic coupling such as has briefly been outlined above, and possessing the stated advantages, constitutes the principal object of the present invention.

The provision of a coupling which is relatively simple in its construction and which therefore may be manufactured at a low cost; one which is comprised of relatively few parts, particularly large relatively moving parts and which therefore is unlikely to get out of order; one which is rugged and durable and which therefore will withstand rough usage; one which is capable of ease of assembly and disassembly for purposes of inspection of parts, replacement or repair thereof; one which may be used in any desired position of orientation, as for example in a horizontal, a vertical or an inclined position; one which is smooth and silent in its operation; and one which, otherwise, is well adapted to perform the services required of it, are further desirable features which have been borne in mind in the production and development of the present invention.

Other objects and advantages of the invention, not at this time enumerated, will readily suggest themselves as the following description ensues.

In the accompanying four sheets of drawings forming a part of this specification, one illustrative embodiment of the invention has been shown.

Figure 1:
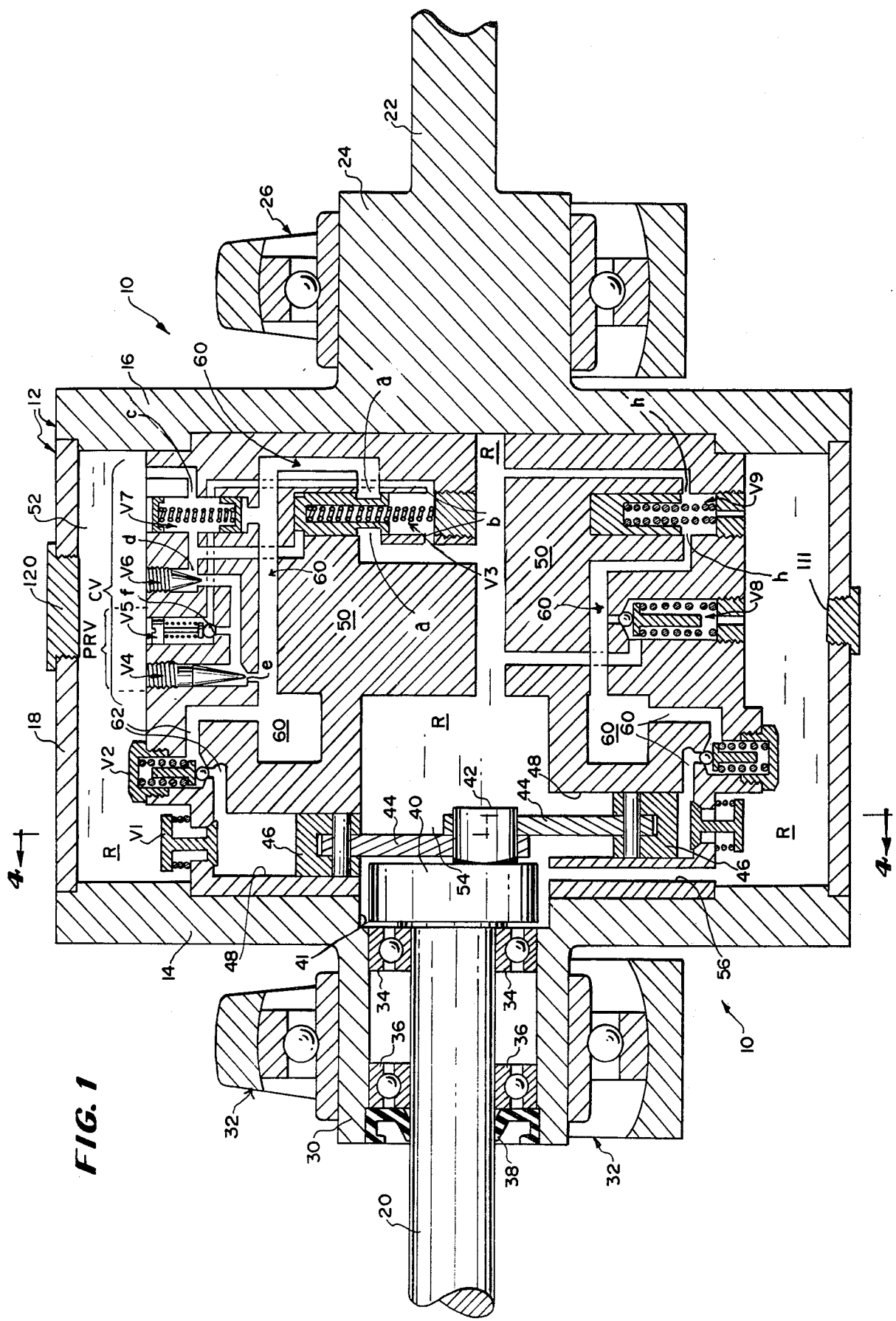
FIG. 1 is a sectional view, somewhat schematic in its representation, taken substantially centrally and longitudinally through a hydrostatic coupling embodying the principles of the present invention.
Figure 5:
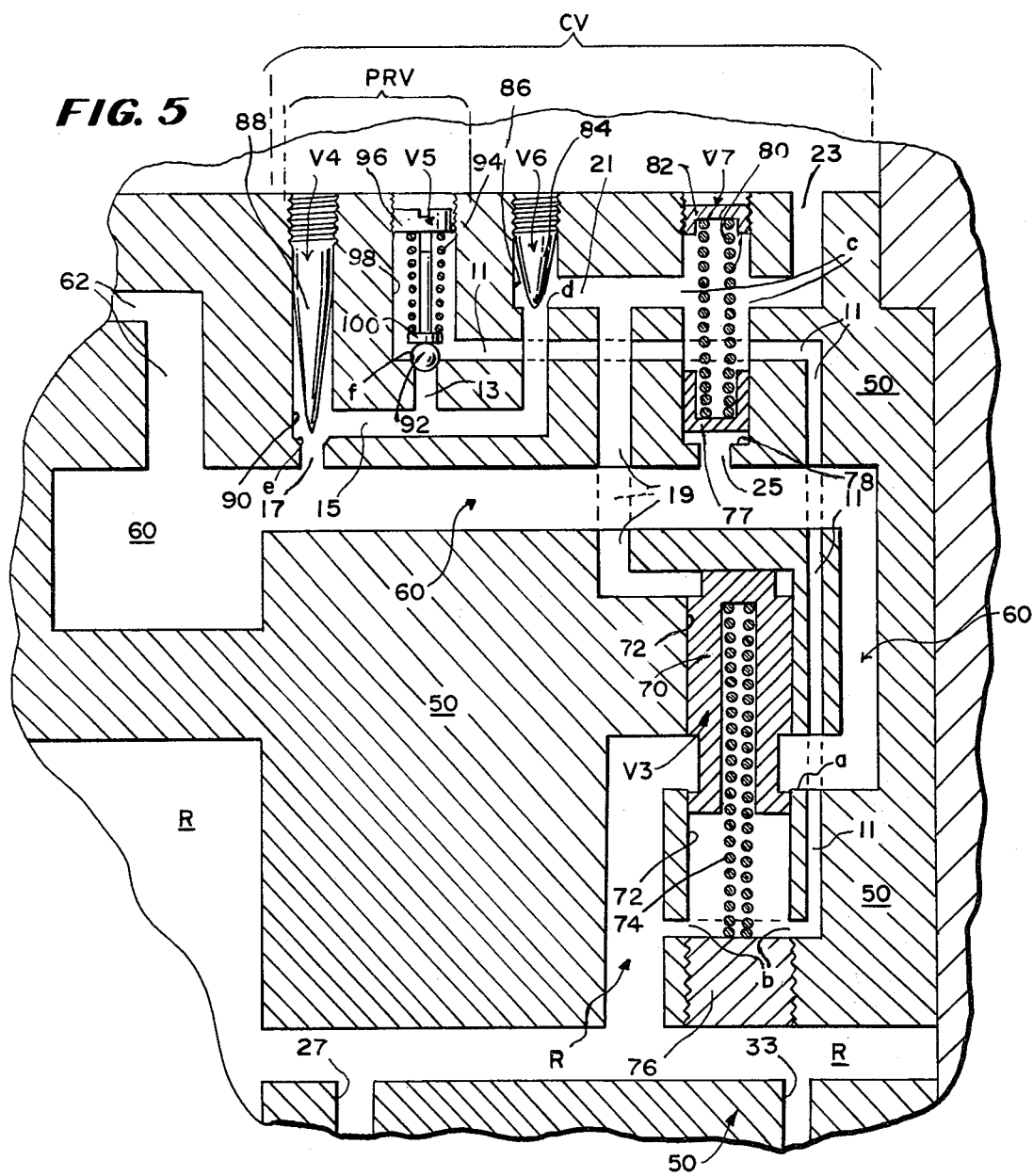
Figure 6:
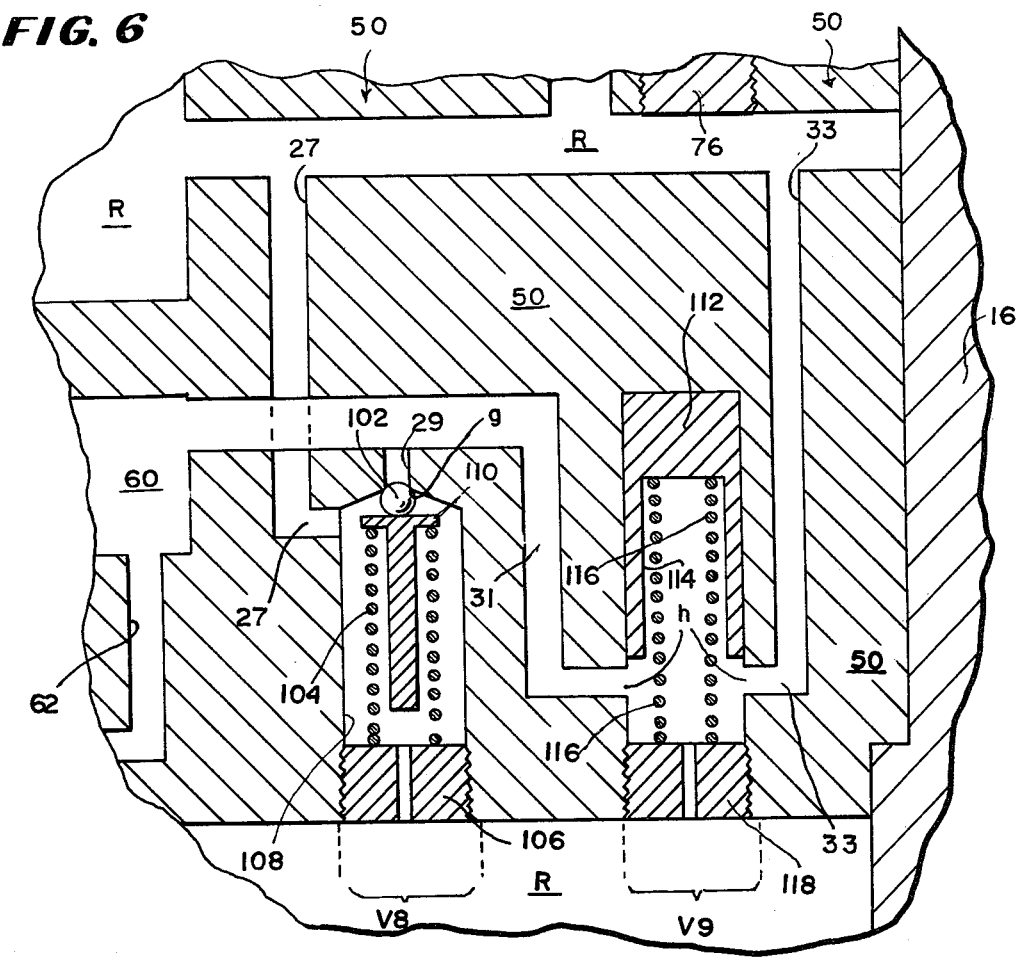

FIG. 5 is a fragmentary sectional view showing the details of a central valve assembly which is employed in connection with the invention, the view representing an enlargement of a portion of the structure of FIG. 1; and FIG. 6 is a fragmentary sectional view showing the details of a bypass valve and a centrigural valve, the view representing an enlargement of another portion of the structure of FIG. 1.

Referring now to the drawings in detail, and in particular to FIG. 1, a hydrostatic coupling constructed according to the present invention is designated in its entirety by the reference numeral 10 and it embodies a generally cylindrical casing 12 having opposed circular walls 14 and 16, and an outer cylindrical wall 18. The function of the coupling 10 is to translate the rotary motion of an input or drive shaft 20 to an output or driven shaft 22 in such a manner that it permits the drive shaft 20 to attain its normal running speed rapidly while at the same time bringing the driven shaft 22 gradually up to the same speed but at a considerably reduced rate of acceleration, all in a manner that will become clear when the nature of the invention is better understood.

In the form of the invention selected for illustration herein, the output or driven shaft 22 is preferably, but not necessarily, formed integrally with the wall 16, although it may be bolted or otherwise secured to the casing if desired, the only requisite being that it rotate bodily with the casing. The drive shaft 20 is separate from the casing and it projects into the latter through the wall 14, the two shafts 20 and 22 being coaxial.

For convenience of description herein, throughout this specification and in the appended claims, the wall 16 will be regarded as the front wall while the wall 14 will be regarded as the rear wall. Thus the driven shaft 22 projects forwardly and outwardly of the casing 12 and it is provided with an enlarged hub 24 which is rotatably supported in a bearing assembly 26. The rear wall 14 is formed with a cylindrical tubular hub 30 which is suitably supported in a bearing assembly 32. The two bearing assemblies 26 and 32 thus constitute a bearing support for the rotary casing 12.

The drive shaft 20 projects through the tubular hub 30 and is rotatably supported therein by means of front and rear bearing assemblies 34 and 36. Immediately behind the rear bearing assembly 36, a suitable lip seal or the like 38 surrounds the drive shaft and retains transmission fluid within the casing 10 which, otherwise, is fluid tight.

Figure 4:
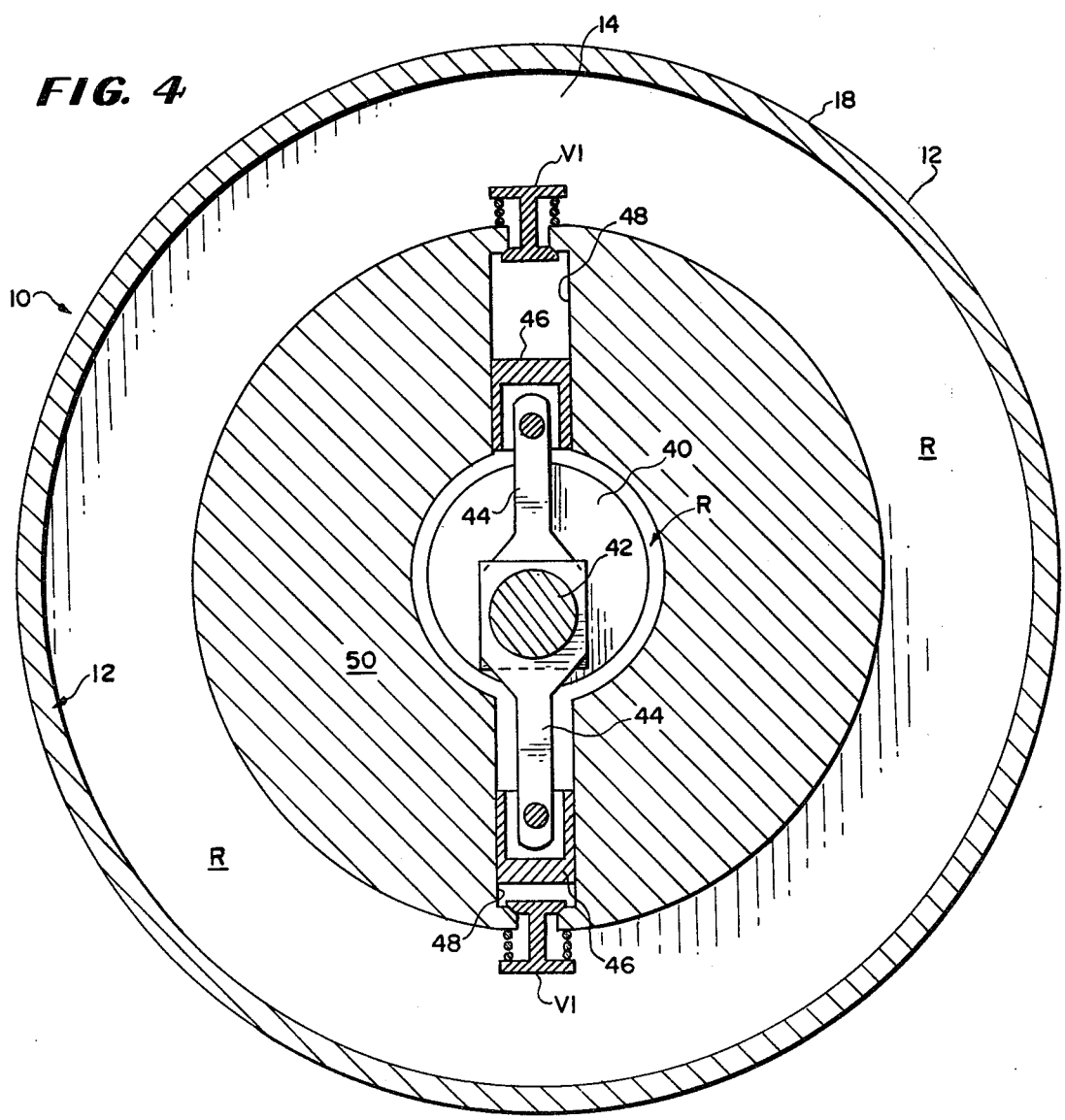
FIG. 4 is an enlarged sectional view taken substantially on the line 4—4 of FIG. 1.

The forward end of the drive shaft 20 is provided with an enlarged crankhead 40 which is disposed immediately forwardly of the front bearing assembly 34 and which operates within a shallow internal recess 41 which is formed in the rear wall 14. The crankhead 40 is provided with an eccentric crank arm 42 which is drivingly connected by connecting rods 44 to a pair of pistons 46 (see also FIG. 4) which are reciprocable in a pair of diametrically disposed, radially extending cylinders 48, the axes of which are slightly misaligned in a fore and aft direction. The cylinders 48 are provided in a generally annular block-like cylinder and valve supporting structure 50 which is fixedly disposed within the casing 12 for rotation in unison therewith and which spans the distance between the front and rear walls 16 and 14. The casing 12, together with its internal annular cylinder and valve supporting structure 50, establishes a composite internal fluid reservoir R which consists of the outer annular space 52 which exists between the structure 50 and the wall 18 and the inner central space 54 within the annular structure 50, these two spaces being in communication with each other by means of one or more radial passages 56. For convenience of description herein, the entire reservoir which includes the aforementioned inner and outer spaces 54 and 52 is designated by the reference letter or symbol R. The casing 12 is adapted to be substantially filled with a quantity of a suitable non-compressible fluid such as oil of the transmission fluid type.

Disposed within the annular structure and extending therearound is a continuous circular or annular manifold space 60 which will hereinafter be referred to simply as the manifold. The two pistons 46 are adapted to pump fluid from the reservoir R to the manifold 60 and an arrangement of valving is carried by the structure 50 and serves variously to admit fluid from the manifold 60 back to the reservoir, all in a manner and for purposes that will be made clear subsequently.

Figure 2:
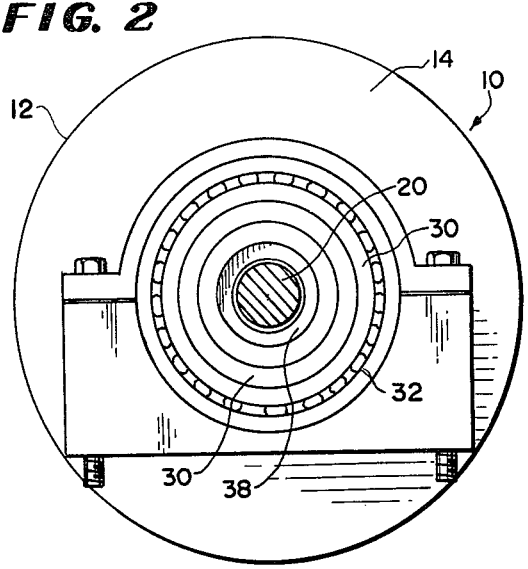
FIG. 2 is a left hand end view of the structure shown in FIG. 1.
Figure 3:
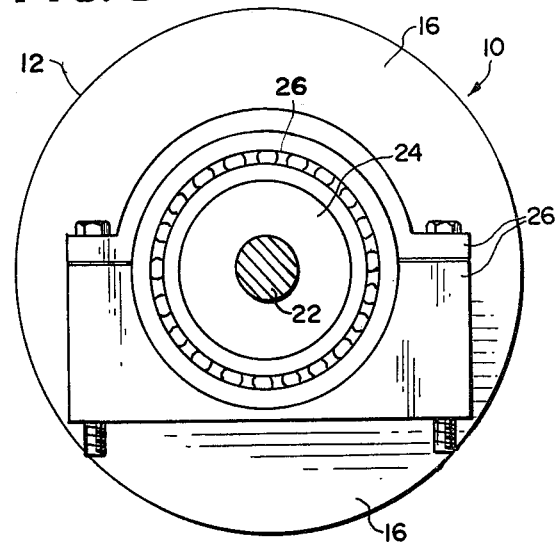
FIG. 3 is a right hand end view of the structure shown in FIG. 1.

Still referring to FIGS. 1 and 2, the outer end of each cylinder 48 communicates with the reservoir R through the medium of a pair of normally closed unidirectional cone-type check valves V1. The outer end of each cylinder also communicates with the manifold 60 through a manifold inlet passage 62 within which there is disposed a pair of spring biased ball type outlet check valves V2. The check valves V1 and V2 are so arranged and designed that during the inward stroke of the pistons 46 fluid will unseat the valves V1 and be drawn from the reservoir R into the cylinders 48 while at the same time the ball valves V2 will remain seated. During the outward stroke of the pistons 46, the pressure of fluid will unseat the ball valves V2 and such fluid as had previously been drawn into the cylinders through the valves V1 will be forced forwardly through the passages 62 and into the manifold 60.

The manifold 60 is connected to the reservoir R through a plurality of valve controlled reservoir outlet or return passages, the nature of which and the valving therefor will be set forth in detail subsequently. The basic principle of operation of the present hydrostatic coupling 10 is, in itself, not novel and it is predicated upon the fact that the amount of torque which is applied to the casing 12 by the input or drive shaft 20 is a substantially direct function of the pressure differential which is maintained in the reservoir R and manifold 60 respectively. If the fluid which is pumped by the valves V1 and V2 from the reservoir R to the manifold 60 is able to flow freely through the various outlet or return passages leading from the manifold to the reservoir without obstruction, the pressure within the reservoir and manifold will be substantially equalized and the pistons 46 will serve simply to draw fluid from the reservoir and return it through the manifold to the reservoir without developing any appreciable pressure within the cylinders 48. Without any obstruction to fluid flow through the manifold 60, the rotary motion of the input or drive shaft 20 will not be transmitted to the casing 12 and the latter will remain stationary. If the valving associated with the outlet or return passages leading from the manifold 60 back to the reservoir R is such that these passages (considered collectively) are partially blocked or closed, pressure will build up within the cylinders 48 and initiate rotation of the casing 12 at a lesser speed than that of the input or drive shaft 20. If the valving is such that the output passages leading from the manifold 60 to the reservoir R are completely blocked, the casing 12 will rotate in unison with the shaft 10 since the crank arm 42 and its associated connecting rods 44 are unable to drive the pistons 46 to the ends of their outer strokes due to the incompressibility of the fluid within the cylinders 48. Utilizing somewhat different structure, this basic principle of operation is used in a number of earlier patents, as for example the aforementioned U.S. Pat. Nos. 1,173,622 and 2,018,743. However, the valving arrangement of the present invention is not necessarily designed for the purpose of varying the speed of the output shaft or driven member relative to the speed of the input shaft or drive member. Instead, a novel composite control valve arrangement CV is employed for the purpose of establishing a time delay before a full head of pressure is built up in the manifold 60 so that full input torque is not applied to the driven shaft 22 immediately after start-up operations are commenced, but rather such pressure is delayed for a predetermined length of time ranging from a fraction of a second up to several minutes. During this time delay, which is capable of being regulably adjusted, the pressure of fluid in the manifold 60 is gradually built up and the casing 12 and shaft 20 will accelerate substantially uniformly but with gradually increasing torque until the time period has run out, at which time full torque is applied to the casing 12 and shaft 20 so that these members will rotate in unison. As previously indicated, a typical application of the use of such a time delay would be in initiating movement of a long conveyor belt, whether loaded or unloaded, under the driving influence of the shaft 22 in order to take up the slack in the belt before applying full torque to the shaft. In such an instance, the drive shaft 20 would be allowed to accelerate rapidly and attain full running speed while the driven shaft 22 would accelerate at a relatively low rate, such rate being predetermined or gauged so that after the time delay period has elapsed, the slack in the belt will have been completely assimilated. Thereafter, a full head of fluid is allowed to build up in the manifold and, when this has been accomplished, the driven shaft 22 will be driven in unison with the drive 20 shaft.

The control valve arrangement or assembly CV includes as functional elements thereof a series of five interrelated valve components including a control valve proper V3, a volume valve V4, a relief valve V5, a metering valve V6 and a drain valve V7. The nature and function of these various valves V3 to V7 inclusive will be described in considerable detail presently.

In addition to the valving associated with the aforementioned time delay valve assembly CV, a regulable bypass valve V8 (FIG. 1) and a centrifugal valve V9 are interposed between the manifold 60 and reservoir R. The function of the bypass valve V8 is to bleed fluid pressure in the manifold 60 to the reservoir R at such time as an overload is imposed upon the driven shaft 22. The function of the centrifugal valve V9 is to bleed the pressure in the manifold 60 directly to the reservoir R at such time as the driven shaft 22 falls below a predetermined speed. The centrifugal valve V9 admits fluid from the manifold 60 to the reservoir R for a short period of time after start-up operations but when the driven shaft 22 attains such predetermined speed, the valve V9 prevents flow of fluid from the manifold to the reservoir, thereby allowing fluid pressure to build up in the manifold after the time control valve assembly CV has become effective to hold such pressure. During shutdown operations after the motive force is removed from the drive shaft 20, the casing 12 and driven shaft will decelerate and, at such time as they return to the aforementioned low predetermined speed, the centrifugal valve V9 will again admit or bleed fluid pressure in the manifold back to the reservoir, at which time the control valve assembly will be restored to its original condition, all in a manner that will be made clear presently.

Considering now the specific nature and disposition of the control valve assembly CV, and referring particularly to FIG. 5, the control valve proper V3 is essentially a pressure responsive valve and it is comprised of a valve body or spool 70 which operates within a cylinder 72, the latter being generally radially disposed relative to the cylindrical casing 12. A spring 74 yieldingly biases the valve spool 70 to an outer extended position, and wherein the inner end of the spring 74 bears against a plug-like stop member 76 which is threadedly received within the inner end of the cylinder 70. The cylinder 72 is provided with an outer port a and an inner port b. The port a establishes communication between the manifold 60 and the reservoir R. The port b establishes communication between the reservoir R and a passage 11 which extends to the relief valve V5 and communicates with a passage 13 leading to the reservoir R through passages 15 and 17. The valve V3 is a pressure responsive valve and the outer end of the cylinder 72 communicates through passages 19, 21 and 23 with the reservoir R and it also communicates with the manifold 60 through passages 19, 21, 15 and 17.

The drain valve V7 (FIG. 5) is interposed between the passages 21 and 23 and is adapted, in a manner that will be set forth presently, to close a normally open port c which establishes communication between the passages 21 and 23. It will be apparent therefore that when the port c is open, fluid under pressure within the manifold 60 will be drained to the reservoir R through passages 17, 15, 21 and 23. When the port c is closed by the drain valve V7, the fluid pressure in the manifold 60 will be effective on the valve spool 70 of the control valve V3 through the passages 17, 15, 21 and 19 to move the spool 70 inwardly against the action of the spring 74.

Still referring to FIG. 5, the drain valve V7 is comprised of a shiftable valve body 77 of cup-shaped design which is yieldingly urged against an annular seat 78 by means of a spring 80 which is interposed between the body 77 and an adjustable reaction member 82 against which the spring 80 bears. The inner end of the valve body 77 is exposed to fluid pressure within the manifold 60 through a passage 25. From the above description it will be apparent that when the pressure of fluid within the manifold 60 exceeds that within the reservoir R by a predetermined amount, depending upon the setting of the reaction member 82, the valve body 77 will be forced outwardly against the action of the spring 80 so that it will progressively close the port c and subject the valve spool 70 of the valve V3 to the pressure of fluid within the manifold 60 through the aforementioned passages 17, 15, 21 and 19.

Still discussing the control valve arrangement CV with reference to FIG. 5, the metering valve V6 is comprised of a valve element proper 84 which is threadedly and adjustably mounted in a radial bore 86. The valve element 84 cooperates with a valve seat d which is interposed between the passages 15 and 21. The metering valve V6 thus controls the rate of flow of fluid from the former passage to the latter passage and therefore regulates the buildup of fluid pressure in the passage 19 and acting upon the valve spool 70 of the control valve V3.

The volume control valve V4 and the relief valve V5, in combination with each other, constitute a pressure reducing valve arrangement PRV (FIGS. 5 and 6), the former valve V4 being similar in structure to the previously described metering valve V6 and consisting of a valve element proper 88 which is threadedly and adjustably received in a radial bore 90 and which cooperates with a valve port e which is interposed between the passages 17 and 15.

The relief valve V5 embodies a ball valve element 92 which normally rests on a valve seat f and which is yieldingly urged against such seat by means of a spring 94. The spring 94 bears at its outer end against a reaction member 96 which is threadedly received in a bore 98. The spring 94 bears at its inner end against a ball follower 100. The valve seat f is interposed between the passages 11 and 13. From the above description it will be readily apparent that the pressure reducing effect of the two valves V4 and V5 is dependent upon the setting of the valve element 88 and upon the setting of the reaction member 96 which regulates the pressure exerted upon the ball valve element 92.

Referring now to FIGS. 1 and 6, the aforementioned relief valve V8 is similar in construction to the aforementioned relief valve V5 and it embodies a ball valve element 102 which normally rests on a valve seat g (see particularly FIG. 6) and which is yieldingly biased against such seat by a spring 104. The spring 104 bears at its outer end against a reaction member 106 which is threadedly received within a bore 108. The inner end of the spring 104 bears against a ball follower 110. The valve seat g is interposed between a passage 27 leading from the reservoir R and a passage 29 which leads to the manifold 60. Thus, when the pressure of fluid within the manifold 60 exceeds the combined hydrostatic and spring pressure exerted upon the ball 102, the ball will be lifted from its seat g and fluid will be bled from the manifold 60 to the reservoir R. As stated previously, the function of the bypass valve V8 is to bleed fluid pressure within the manifold 60 at such time as an overload is imposed upon the driven shaft 22. The extent of permissible overload may be regulated by adjusting the setting of the reaction member 106 (FIGS. 1 and 6) after removing a threaded plug 111 which is removably received in the casing wall 18.

The centrifugal valve V9 is comprised of a valve body 112 which is slidable in a radially extending bore 114 and which is yieldingly biased by means of a spring 116 to a retracted inner position. The inner end of the spring seats within the cup-shaped valve body 112 and the outer end of the spring seats against a threaded reaction member 118 which is adjustable within the bore 114 to vary the spring force which is exerted upon the valve body 112. Normally at low speeds of rotation of the casing 12, the valve body 112 will remain in its retracted position but, as the speed of rotation of the casing increases to a predetermined minimum, centrifugal force will impel the valve body 112 outwardly and cause gradual closing of a valve port h which is interposed between a passage 31 leading from the manifold 60 and a passage 33 leading to the reservoir R. As will be described presently when the operation of the present hydrostatic coupling 10 is set forth, the pressure exerted by the spring 116 on the valve body 112 is not great and therefore the port h is adapted to become closed shortly after start-up operations and to remain closed during normal or running operation of the coupling 10. Then, at such time as the casing 12 decelerates and approaches a complete shutdown condition, the spring 116 moves the valve body 112 from its cutoff position relative to the port h and opens the latter.

In the operation of the herein described hydrostatic coupling 10, as soon as start up operations are initiated, the drive shaft 20 will attain speed rapidly and come up to rated or normal running speed in a relatively short period of time. During such acceleration of the shaft 20, the pistons 46 will be reciprocated in their respective cylinders 48 and, during the inward strokes of each piston, fluid will be drawn from the reservoir R so as to unseat the associated valve V1 and caused to enter the adjacent cylinder 48. During the outward stroke of each piston 46, fluid will allow the associated valve V1 to become seated while the adjacent ball type check valve V2 will be unseated and fluid will be forced through the passage 62 and into the manifold 60. The initial rapid acceleration and attainment of speed by the drive shaft 20 is made possible by reason of the fact that at the outset the outer port a (FIGS. 1 and 5) of the control valve V3 and the port h (FIGS. 1 and 6) of the centrifugal valve V9 are, at this time, open. When these two ports a and h are in their open condition, three fluid paths are established for substantially unobstructed flow of fluid from the manifold 60 to the reservoir R. The first of these three paths extends from the manifold 60 (FIG. 5) directly through the inner port a of the control valve V3 to the reservoir R. The second path extends from the manifold 60 (FIG. 6) through the passage 31, port h of the centrifugal valve V9, and passage 33 to the reservoir R. The third path extends from the manifold 60, (FIG. 5) through passages 17, 15, port d, passage 21, port c of the drain valve V7 and passage 23 to the reservoir R. By reason of these three fluid path, fluid pressure is unable to build up in the manifold 60 while the input shaft is rotating at relatively low speed and, as a consequence, the pistons 46 will encounter practically no resistance to their outward motion and no torque will be applied to the casing 12 during these initial starting up operations.

However, due to the size of the ports c and a, and to the size of the port d as restricted by the valve body 84 of the metering valve V6, some pressure is gradually generated in the manifold 60 so that at a predetermined time the pressure within the manifold 60 acts through the passage 25 (FIG. 5) on the valve body 77 of the drain valve V7, thus causing the port c to become closed. With the port c now closed, the aforementioned third fluid escape path will be blocked and the fluid pressure existing in the manifold 60, and passages 17, 15 and 21 (FIG. 5) is directed through the passage 19 and against the inner end of the valve body 70 of the control valve V3, thus shifting the valve body 70 within the valve cylinder in the direction of the stop member 76 and tending to close the valve port a. The rate of movement of the valve body 70 is regulated by adjusting the position of the valve element 88 of the valve V4 toward and away from the valve seat e, and it is also regulated by adjusting the position of the valve element 84 of the metering valve V6 toward and away from the valve seat d. The two valves V4 and V6 thus regulate the metered volume of fluid that may flow through the passages 21 and 19 for actuating the valve body of the control valve V3. Adjustment of the valve element 88 is facilitated by the provision of a removable plug 120 (FIG. 1) in the outer wall 18 of the casing 12. This plug allows the adjustment to be made without dismantling the coupling 10.

With the port a now gradually closing at the desired rate, the first mentioned fluid escape path from the manifold 60 will be blocked and the pressure of fluid within the manifold 60 rises still further and, as it does so, the pistons 46 encounter appreciable resistance to their outward motion and the casing 12 and output shaft 22 commence to rotate. When the casing and output shaft attain a predetermined speed, the centrifugal force acting on the valve body 112 of the centrifugal valve V9 (FIG. 6) overcomes the biasing action of the spring 116 and causes the valve body 112 to move toward the reaction member or stop 118, thus closing the port h and shutting off the escape of fluid from the manifold 60 through the passage 33.

With the port h closed, the last of the aforementioned fluid escape paths from the manifold 60 will be blocked, thus allowing fluid pressure in the manifold 60 to rise to the point where it overcomes the spring pressure acting on the ball 92 (FIG. 5) of the relief valve V5, whereupon fluid will pass through a new and fourth escape path, extending from the manifold through passages 17, 15, 13, seat f, passage 11 and port b of the control valve V3 to the reservoir R. Since the fourth path of fluid escape is the only path now available for flow of fluid from the manifold 60 to the reservoir R, the pressure of fluid in the manifold is held substantially constant so that the valve body 70 of the valve V3 moves at a constant rate until it seats upon the stop member 76 and closes the port b, thereby again blocking all escape of fluid from the manifold 60 to the reservoir. At this time the casing 12 and output shaft 22 are rotating at substantially the same speed, less a small percent to compensate for fluid leakage or slip.

The bypass valve V8 (FIGS. 1 and 6) is initially adjusted for a pressure setting slightly higher than normal running pressure so that when the hydrostatic coupling 10 is operating at full load, the ball 102 will remain against the seat g. In the event of an overload on the casing 12 and shaft 22, the pressure of fluid within the manifold 60 will increase and overcome the force of the spring 104 on the ball 102 of the bypass valve V8, thus raising the ball 102 from its seat g so as to bypass fluid directly from the manifold 60 to the reservoir R.

At such time as the drive shaft 20 is relieved of its motivating force, the casing 12 and shaft 22 will commence to decelerate and, at a relatively low predetermined speed of rotation, the spring 116 of the centrifugal valve V9 (FIGS. 1 and 6) will overcome the centrifugal force acting on the valve body 112 and cause the latter to move toward its original starting position thus opening the port h and allowing fluid to be expelled from the manifold through the passages 31 and 33 to the reservoir. When the pressure of fluid within the manifold 60 reaches a further predetermined low pressure, the spring 80 of the drain valve V7 (FIG. 5) will overcome the pressure of fluid within the manifold 60 and cause the valve body or spool 77 to return to its original or starting position, thus opening the port c and allowing fluid to be expelled from the manifold 60 through the passages 17, 15, 21 and 23. When all of the excess fluid has been expelled from the manifold 60, the pressure within the latter, and within the reservoir R, will be equalized and the coupling will be in condition for the next succeeding start operation.

It is to be noted at this point that the openings for either the plug 111 or the plug 120 may be used as a filling opening for the reservoir R and manifold 60.

The invention is not to be limited to the exact arrangement of parts shown in the accompanying drawings or described in this specification since various changes in the details of construction may be resorted to without departing from the spirit of the invention. For example, from the foregoing description it will be apparent that the volume valve V4 and the relief valve V5, in combination with each other, function as a pressure reducing arrangement. It is therefore contemplated that the desired fluid pressure reduction which is attained by these valves may be effected by the use of a single composite pressure reducing valve which, in effect, combines the functions of the valves V4 and V5. Additionally, for certain applications, it may be found advisable to omit the time delay valving arrangement and use the centrifugal and bypass valves in conjunction with each other, thus bypassing fluid from the manifold to the reservoir through the centrifugal valve until the centrifugal force acting on the latter valve closes the associated valve port h at which time the drive shaft 20 will become effective to attain speed at the maximum rate of acceleration capable of being produced by the input forces. Therefore, only insofar as the invention has particularly been pointed out in the accompanying claims is the same to be limited.

Having thus described my invention, what I claim and desire to secure by Letters Patent is:

1. A hydrostatic coupling comprising a drive shaft, a driven shaft aligned with the drive shaft and establishing an internal reservoir into which the drive shaft projects in sealed relationship, radially disposed cylinders interiorly of the casing for rotation bodily therewith, means within the casing establishing a manifold having first and second passages leading therefrom to the reservoir, a crank head on the drive shaft, a piston slidably disposed in each cylinder, a connecting rod extending between an eccentric point on the crank head and each piston, an inflow check valve effective between each cylinder and the reservoir, an outflow check valve effective between each cylinder and the manifold, a volume control valve interposed in said first passage for restricting the flow of fluid through such passage, and a bypass valve interposed in said second passage and normally closing the latter, said bypass valve being effective when the pressure of fluid in the manifold exceeds the pressure of fluid in the reservoir by a predetermined amount to open said latter passage.

2. A hydrostatic coupling as set forth in claim 1, wherein the volume control valve embodies a valve port and a valve element adjustable toward and away from said port to vary the effective size thereof.

3. A hydrostatic coupling as set forth in claim 1, wherein a drain valve is interposed in said first passage and includes a valve port and a valve body movable between a normally extended position wherein such port remains open, and a retracted position wherein it covers and consequently closes said latter port, spring means yieldingly biasing said valve body to its extended position, said valve body being responsive for its movements to the pressure of fluid in said manifold and being effective when extremely low pressure is developed in the manifold to move to its extended position.

4. A hydrostatic coupling as set forth in claim 1, wherein the passages which lead from the manifold to the reservoir further include a third passage, and a centrifugal valve is interposed in said third passage, said latter valve including a valve port, a radially shiftable valve body movable into and out of cutoff relationship with respect to such port between a fully retracted open position and advanced cutoff positions, spring means yieldingly biasing said valve body toward its fully open retracted position, said valve body being movable to its cutoff relationship relative to its associated port at such time as the casing attains and exceeds a predetermined speed of rotation.

5. A hydrostatic coupling as set forth in claim 3, wherein the passages which lead from the manifold to the reservoir further include a third passage, and a centrifugal valve is interposed in said third passage, said latter valve including a valve port, a radially shiftable valve body movable into and out of cutoff relationship with respect to such port between a fully retracted open position and advanced cutoff positions, spring means yieldingly biasing said valve body toward its fully open retracted position, said valve body being movable to its cutoff relationship relative to its associated port at such time as the casing attains and exceeds a predetermined speed of rotation.

6. A hydrostatic coupling as set forth in claim 1, wherein said control valve includes a valve port, and a valve spool movable into and out of cutoff relationship with respect to said port between a retracted fully open position and an advanced port cutoff position, said valve spool being responsive for its movements to the pressure of fluid within the manifold.

7. A hydrostatic coupling as set forth in claim 6, wherein spring means are provided for yieldingly biasing said control valve spool to its retracted position, a fluid passage extends between the manifold and control valve for applying fluid under pressure to said spool to move the same against the action of said spring means, and a metering valve is interposed in said latter fluid passage for regulating the quantity of fluid applied to said valve spool.

8. A hydrostatic coupling as set forth in claim 6, wherein the passages which lead from the manifold to the reservoir further include a third passage, and a centrifugal valve is interposed in said third passage and includes a valve port, a radially shiftable valve body movable into and out of cutoff relationship with respect to said latter port between a retracted fully open position and advanced cutoff positions, spring means yieldingly biasing said latter valve body toward its fully open retracted position, such valve body being movable to its cutoff relationship relative to its associated port at such time as the casing attains and exceeds a predetermined speed of rotation.

9. A hydrostatic coupling as set forth in claim 8, wherein said bypass valve embodies a valve seat interposed in said second passage, and a spring biased ball valve element cooperating with said seat.

10. A hydrostatic coupling as set forth in claim 9, wherein said bypass valve embodies a valve seat interposed in said second passage, a ball valve element cooperating with said seat, and a spring having one end effectively bearing against said ball valve element and its other end bearing against an adjustable threaded reaction member, said casing is provided with a filling opening in substantial radial alignment with said reaction member, and a removable access and filling plug closes said opening and, when removed, affords access to the reaction member for adjustment purposes.

11. A hydrostatic coupling as set forth in claim 6, wherein a third passage establishes communication between said manifold and reservoir, said control valve is also interposed in said third passage and is provided with a second normally open port which is adapted to be closed by a cutoff operation when the control valve spool moves to its fully advanced position.

12. A hydrostatic coupling as set forth in claim 11, wherein a normally closed relief valve is interposed in said third passage and is effective when the pressure of fluid in said manifold exceeds a predetermined maximum to open said second port.

13. A hydrostatic coupling as set forth in claim 12, wherein a fourth passage establishes communication between said manifold and reservoir, and a centrifugal valve is interposed in said fourth passage and includes a valve port, a radially shiftable valve body movable into and out of cutoff relationship with respect to said latter port between a retracted fully open position and advanced cutoff positions, spring means yieldingly biasing said latter valve body toward its fully open retracted position, such valve body being movable to its cutoff relationship relative to the associated port at such time as the casing attains and exceeds a predetermined speed of rotation.

14. A hydrostatic coupling as set forth in claim 13 wherein a fifth passage establishes communication between said manifold and reservoir, a drain valve is interposed in said fifth passage and includes a valve port and a valve body movable between a normally retracted position wherein such port remains open, and an advanced position wherein it covers and consequently closes said latter port, spring means yieldingly biasing said latter valve body to its retracted position, said latter valve body being responsive for its movements to the pressure of fluid in said manifold and being effective when pressure of fluid in the manifold exceeds that in the reservoir by a predetermined amount to move to its advanced position.

15. A hydrostatic coupling comprising a driven shaft, a drive shaft coaxial with said driven shaft, a generally cylindrical fluid tight casing carried by said driven shaft and including front and rear circular walls and a cylindrical outer wall, said walls establishing a fluid tight internal chamber, a generally annular supporting structure bridging the distance between said front and rear walls within the casing, rotatable bodily with the latter and defining a centrally disposed inner reservoir space and, in combination with said outer cylindrical wall, defining an outer annular fluid-containing reservoir space, there being at least one radial passage establishing communication between said inner and outer annular spaces for pressure equalizing purposes, an annular manifold encompassing said centrally disposed inner reservoir space, said supporting structure being formed with a pair of radially extending cylinders, said drive shaft projecting through said rear wall and into said inner reservoir space, a crank head carried by said drive shaft within such inner reservoir space, a piston slidably disposed in each cylinder, a connecting rod extending between an eccentric point on the crank head and each piston, an inflow check valve effective between each cylinder and said outer annular reservoir space to admit fluid from the outer reservoir space into the cylinder during the inward stroke of its respective piston, an outflow check valve effective between each cylinder and the annular manifold to force fluid into the latter during the outward stroke of its respective piston, there being a passage extending between said manifold and at least one of said reservoir spaces, and valve means for regulably controlling the flow of fluid through said passages.

16. A hydrostatic coupling comprising a generally cylindrical rotatable casing having opposed end walls and an outer cylindrical wall, an annular block-like structure disposed within said casing and spanning the distance between said end walls, said structure, in combination with the casing, defining an outer annular reservoir space and a central reservoir space, said reservoir spaces being in communication with each other and defining a composite fluid reservoir, a drive shaft projecting through one of said end walls in sealed relationship and into said inner reservoir space, a crank head on said drive shaft, a driven shaft coaxial with said drive shaft, projecting laterally from the other end wall and rotatable bodily in unison with the casing, said block-like structure being provided with an internal annular manifold which encompasses the central reservoir space, a pair of passages extending between the manifold and reservoir, said block-like structure defining a plurality of radially disposed cylinders, a piston slidably disposed in each cylinder, a connecting rod extending between an eccentric point on the crank head and each piston, an inflow check valve extending between each cylinder and the reservoir, an outflow check valve extending between each cylinder and the manifold, and valve means for controlling the flow of fluid through said passages and effective to regulably bleed fluid from the manifold to the reservoir.

* * * * *